(12) United States Patent
Zhang et al.

(10) Patent No.: US 12,195,659 B2
(45) Date of Patent: Jan. 14, 2025

(54) GREENHOUSE GAS EMISSION REDUCTION METHOD FOR HEAVY METAL CONTAMINATED SOIL

(71) Applicant: JIANGXI AGRICULTURAL UNIVERSITY, Jiangxi (CN)

(72) Inventors: Ling Zhang, Jiangxi (CN); Yu Gao, Jiangxi (CN); Baihui Wang, Jiangxi (CN); Jian Bai, Jiangxi (CN); Aixin Li, Jiangxi (CN); Laicong Luo, Jiangxi (CN); Xiaoqin Lai, Jiangxi (CN)

(73) Assignee: JIANGXI AGRICULTURAL UNIVERSITY, Nanchang (CN)

(*) Notice: Subject to any disclaimer, the term of this patent is extended or adjusted under 35 U.S.C. 154(b) by 0 days.

(21) Appl. No.: 18/632,384

(22) Filed: Apr. 11, 2024

(65) Prior Publication Data
US 2024/0254392 A1 Aug. 1, 2024

Related U.S. Application Data

(63) Continuation of application No. PCT/CN2022/121550, filed on Sep. 27, 2022.

(30) Foreign Application Priority Data

Oct. 14, 2021 (CN) .......................... 202111199123.9

(51) Int. Cl.
| | |
|---|---|
| C09K 17/06 | (2006.01) |
| B01J 20/04 | (2006.01) |
| B09C 1/08 | (2006.01) |
| C01B 25/32 | (2006.01) |

(52) U.S. Cl.
CPC ............. C09K 17/06 (2013.01); B01J 20/048 (2013.01); B09C 1/08 (2013.01); C01B 25/32 (2013.01)

(58) Field of Classification Search
CPC .......... C09K 17/06; B01J 20/048; B09C 1/08; C01B 25/32
See application file for complete search history.

(56) References Cited

U.S. PATENT DOCUMENTS 4,017,424 A * 4/1977 Johnson .................... B01J 23/78
502/213
5,162,600 A * 11/1992 Cody ...................... C05B 17/00
71/33

FOREIGN PATENT DOCUMENTS

| CN | 104549386 A | 4/2015 |
| CN | 110508232 A | 11/2019 |
| CN | 110918633 A | 3/2020 |
| CN | 112125752 A | 12/2020 |

OTHER PUBLICATIONS

Machine translation of CN110508232 (Year: 2019).*

* cited by examiner

Primary Examiner — Janine M Kreck

(57) ABSTRACT

The present disclosure provides a greenhouse gas emission reduction method for a heavy metal contaminated soil, falling within the technical field of emission reduction of greenhouse gas nitrous oxide. Specifically, hydroxyapatite (HAP) is added to a soil to effectively reduce the emission of nitrous oxide in the soil, and at the same time, the treatment of heavy metal contamination is realized, which is very suitable for the promotion and use of nitrous oxide emission reduction in the contaminated soil.

3 Claims, 4 Drawing Sheets

GREENHOUSE GAS EMISSION REDUCTION METHOD FOR HEAVY METAL CONTAMINATED SOIL

CROSS-REFERENCE TO RELATED APPLICATIONS

This application is a continuation of PCT/CN2022/121550, filed Sep. 27, 2022 and claims priority of Chinese Patent Application No. 202111199123.9, filed on Oct. 14, 2021, the entire contents of which are incorporated herein by reference.

TECHNICAL FIELD

The present disclosure relates to the technical field of greenhouse gas emission reduction, and in particular to a greenhouse gas emission reduction method for a heavy metal contaminated soil.

BACKGROUND

Hydroxyapatite (HAP), as the major mineral component of bone and teeth, is a major factor affecting the hardness and strength of bone and teeth. Because of its unique structure and inherent characteristics, this biomimetic material can be used as a biocompatible coating for bone repair materials and biological implant materials with high degradation rate, which has good medical value and environmental friendliness. At the same time, HAP is a promising biological calcium phosphate material with broad prospects in the treatment of air, water and soil pollution. Because of its strong adsorption capacity, acid-base adjustability, ion exchange capacity and good thermal stability, it is widely used in heavy metal treatment. The materials for making HAP can come from bones, flue gas desulphurisation gypsum (one of the largest wastes of coal-fired power plants), etc., and can therefore constitute a valuable resource recovery path.

The existing greenhouse gas emission reduction method has some disadvantages, such as a poor application effect in a specific soil, a narrow application range, large variation of emission reduction effect and short duration. There is an urgent need for a method with a wide application range and a good emission reduction effect, especially still exerting the effect of emission reduction in a heavy metal contaminated soil and realizing heavy metal contamination treatment to realize the effective emission reduction of heavy metal contaminated soil.

SUMMARY

An object of the present disclosure is to provide a greenhouse gas emission reduction method for a heavy metal contaminated soil to solve at least one of the technical problems existing in the prior art.

The technical solutions of the present disclosure are as follows.

A greenhouse gas emission reduction method for a soil is provided, HAP being used to reduce the emission of a nitrogen-containing greenhouse gas in a soil.

In a preferred solution of the present disclosure, the nitrogen-containing gas is nitrous oxide.

In a preferred solution of the present disclosure, an amount of HAP is 1-5% of a mass of a dry soil.

In a preferred solution of the present disclosure, the soil is a heavy metal contaminated soil.

In a preferred solution of the present disclosure, HAP is prepared by a sol-gel method using calcium nitrate and phosphoric acid as raw materials.

In a preferred solution of the present disclosure, a preparation method for HAP includes the steps of: mixing a calcium nitrate solution with a phosphoric acid solution, adding aqueous ammonia at 40-50° C. to adjust a pH to 9-11, and continuing to react 30-50 min, followed by ageing to obtain a colloid; washing the colloid with water, followed by performing suction filtering to obtain a filter cake; and drying the filter cake, calcining the dried filter cake, and continuing to grind and sieve the calcined filter cake to prepare HAP.

The present disclosure has the beneficial effects that: HAP is added to the soil to effectively reduce the emission of nitrous oxide in the soil, having a fertility-preserving effect on the soil, and at the same time, the treatment of heavy metal contamination is realized, which is very suitable for the promotion and use of nitrous oxide emission reduction in the contaminated soil.

Figure 1:
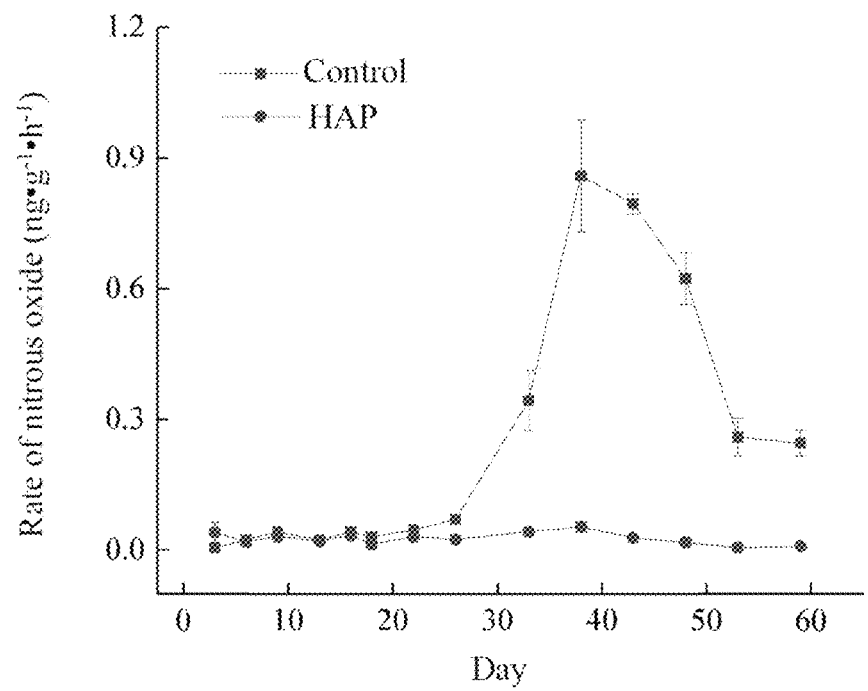
FIG. 1 is a graph showing dynamic changes of rates of nitrous oxide in soils under different emission reduction treatments.

In the figures, a control refers to a blank test soil, and HAP refers to a blank test soil added with HAP; and the difference between a and b is significant, and the difference between A and B is significant.

DETAILED DESCRIPTION

Hereinafter, the preferred mode of the present disclosure will be described in further detail with reference to the attached drawings.

HAP of the present disclosure is self-made or commercially available, and is not limited to the protection scope of the present disclosure.

Example 1

HAP was mainly prepared by a sol-gel method using calcium nitrate and phosphoric acid as raw materials. The main operation steps were as follows.

1. A 0.025 mol/L $Ca(NO_3)_2$ solution and a 0.3 mol/L $H_3PO_4$ solution were prepared. The $Ca(NO_3)_2$ solution was poured into a three-neck flask, and then the $H_3PO_4$ solution was added under stirring (a volume ratio of the $Ca(NO_3)_2$ solution to the $H_3PO_4$ solution being 2:1), and a temperature of a system was maintained at 40-50° C.

2. A pH of the mixed solution was adjusted to 10.00 by adding aqueous ammonia. After the completion of the dripping, the reaction was continued for 40 min and then aging was performed for 24 h.

3. The colloid obtained after the completion of the reaction was washed with distilled water for 3 times, followed by performing suction filtering to obtain a filter cake, and the filter cake was dried in a drying oven at 80° C.

4. The dried filter cake was ground, then calcined in a muffle furnace for 12 h (heating to 600° C. at room temperature within 3 h, and calcining at 600° C. for 9 h), and ground again after the completion of calcination to obtain HAP powder; and the HAP powder was stored after being sieved with a 180-mesh sieve.

The HAP powder was added to a soil for use in an input amount of 3 wt %.

Example 2

1. A 0.025 mol/L $Ca(NO_3)_2$ solution and a 0.3 mol/L $H_3PO_4$ solution were prepared. The $Ca(NO_3)_2$ solution was poured into a three-neck flask, and then the $H_3PO_4$ solution was added under stirring (a volume ratio of the $Ca(NO_3)_2$ solution to the $H_3PO_4$ solution being 2:1), and a temperature of a system was maintained at 40-50° C.

2. A pH of the mixed solution was adjusted to 9.00 by adding aqueous ammonia. After the completion of the dripping, the reaction was continued for 40 min and then aging was performed for 36 h.

3. The colloid obtained after the completion of the reaction was washed with distilled water for 4 times, followed by performing suction filtering to obtain a filter cake, and the filter cake was dried in a drying oven at 80° C.

4. The dried filter cake was ground, then calcined in a muffle furnace for 12 h (heating to 600° C. at room temperature within 3 h, and calcining at 600° C. for 9 h), and ground again after the completion of calcination to obtain HAP powder; and the HAP powder was stored after being sieved with a 180-mesh sieve.

The HAP powder was added to a soil for use in an input amount of 1 wt %.

Example 3

1. A 0.025 mol/L $Ca(NO_3)_2$ solution and a 0.3 mol/L $H_3PO_4$ solution were prepared. The $Ca(NO_3)_2$ solution was poured into a three-neck flask, and then the $H_3PO_4$ solution was added under stirring (a volume ratio of the $Ca(NO_3)_2$ solution to the $H_3PO_4$ solution being 2:1), and a temperature of a system was maintained at 40-50° C.

2. A pH of the mixed solution was adjusted to 11.00 by adding aqueous ammonia. After the completion of the dripping, the reaction was continued for 40 min and then aging was performed for 24 h.

3. The colloid obtained after the completion of the reaction was washed with distilled water for 5 times, followed by performing suction filtering to obtain a filter cake, and the filter cake was dried in a drying oven at 80° C.

4. The dried filter cake was ground, then calcined in a muffle furnace for 12 h (heating to 600° C. at room temperature within 3 h, and calcining at 600° C. for 8 h), and ground again after the completion of calcination to obtain HAP powder; and the HAP powder was stored after being sieved with a 180-mesh sieve.

The HAP powder was added to a soil for use in an input amount of 5 wt %.

HAP prepared in the above Example 1 was tested on soils, and test operation steps were specifically as follows.

1. Test soils were air-dried to obtain dry soils, and a maximum water-holding capacity of the dry soil was determined.

2. HAP and the dry soil were thoroughly mixed in a mass ratio of 3:100, 30 g of the dry soil was taken, and a soil moisture content was adjusted to 60% of the maximum water-holding capacity. The soils were set as: a heavy metal contaminated soil treated with a cadmium chloride solution (cadmium chloride being prepared into a solution and added into the soil, and an addition amount of cadmium ion being 30 mg/kg), a blank test soil, a heavy metal contaminated soil added with HAP and a blank test soil added with HAP.

3. The above samples were put into a constant temperature and humidity incubator for cultivation for 2 months, a temperature of the incubator was maintained at 25° C., and a humidity was maintained at 60%.

4. On 3th, 6th, 9th, 13th, 16th, 18th, 22th, 26th, 33th, 38th, 43th, 48th, 53th, and 59th days, emission rates of nitrous oxide were determined for each of soils using equipment of Agilent 7890B, Santa Clara, CA, USA; and cumulative emissions of greenhouse gas nitrous oxide were calculated.

5. Functional genes of microorganisms (ammonia-oxidizing archaea (AOA) and nirS, a nitrifying bacteria, indicating an emission mechanism of nitrous oxide from the soil) were determined on the $38^{th}$ day, and an available cadmium content in the soil was determined after the completion of the cultivation. (The total DNA of soil was extracted from 0.5 g of tested soil using FastDNA SPIN Kit equipment, and then $N_2O$ functional genes were quantitatively detected, specifically in Shanghai Baile Biotechnology Co. Ltd.)

(1) A calculation formula of an emission rate of nitrous oxide is as follows:

$$F = P \times V \times \frac{\Delta c}{\Delta t} \times \frac{1}{RT} \times M \times \frac{1}{m}$$

where F represents an emission rate of nitrous oxide in a soil, P and V represent the standard atmospheric pressure and a volume of a headspace bottle, $\Delta c/\Delta t$ represents the change of a mass concentration of nitrous oxide per unit time, R is a universal gas constant, T represents an air temperature, M is a molecular mass of nitrous oxide in the soil, and m is a mass of dry soil in the cultivated soil.

(2) A calculation formula of a cumulative emission of nitrous oxide is as follows:

$$E = \sum_{i=1}^{n} \frac{(F_i - F_{i+1})}{2} \times (t_{i+1} - t_i) \times 24$$

where F represents an emission rate of nitrous oxide, i represents the gas collection performed for an $i^{th}$ time, $(t_{i+1}-t_i)$ represents the number of days between two sampling, and n represents the number of times of gas collection.

In addition, physical and chemical property tests were performed on a blank test soil and a blank test soil added with HAP. The test results are shown in the table below.

TABLE 1

| | Study on physical and chemical properties of soil | | | | |
|---|---|---|---|---|---|
| | pH | Ammonium nitrogen mg/kg | Nitrate nitrogen mg/kg | Organic matter mg/g | Total nitrogen mg/g |
| Control | 5.45 ± 0.02 | 217.95 ± 6.72 | 12.10 ± 0.28 | 10.33 ± 0.18 | 0.75 ± 0.04 |
| HAP | 9.59 ± 0.01 | 18.76 ± 1.19 | 2.20 ± 0.20 | 9.53 ± 0.10 | 0.73 ± 0.05 |

Note: in the table, the control refers to the blank test soil, and HAP refers to the blank test soil added with HAP.

As can be seen from Table 1, ammonium nitrogen and nitrate nitrogen reduce significantly in the blank test soil added with HAP compared to the blank test soil, indicating that the addition of HAP in the soil can reduce ammonium nitrogen and nitrate nitrogen in the soil.

Figure 2:
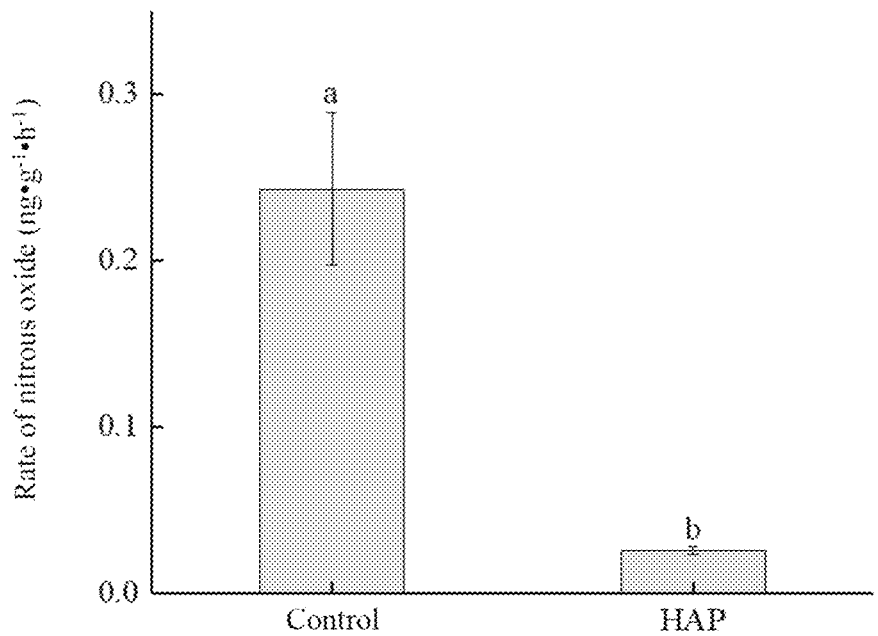
FIG. 2 is a graph showing the effect of different emission reduction treatments on average emission rates of nitrous oxide in the soils.

In addition, emission rates of nitrous oxide in the blank test soil and the blank test soil added with HAP on different days were tested, as shown in FIG. 1. The effect on an average emission rate of nitrous oxide in the blank test soil and the soil added with HAP is shown in FIG. 2. It can be seen from FIGS. 1 and 2 that the emission rate of the nitrous oxide in the soil added with HAP is lower than that in the blank test soil without addition, indicating that HAP can inhibit the emission rate of nitrous oxide in soil; and it can also be seen from FIG. 2 that the average emission rates of nitrous oxide between the two are significantly different.

Figure 3:
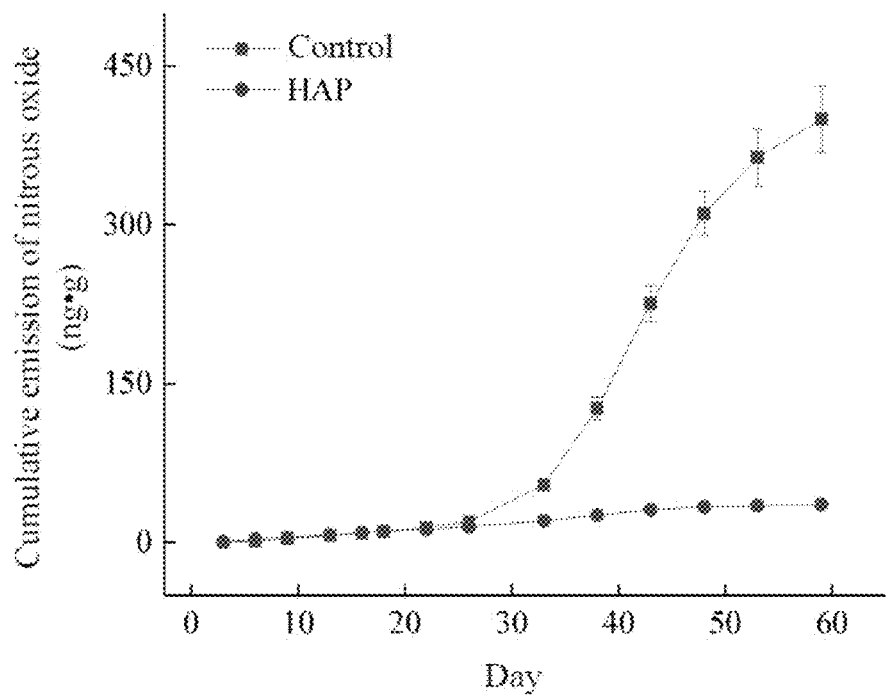
FIG. 3 is a graph showing dynamic changes of cumulative emissions of nitrous oxide in soils under different emission reduction treatments.
Figure 4:
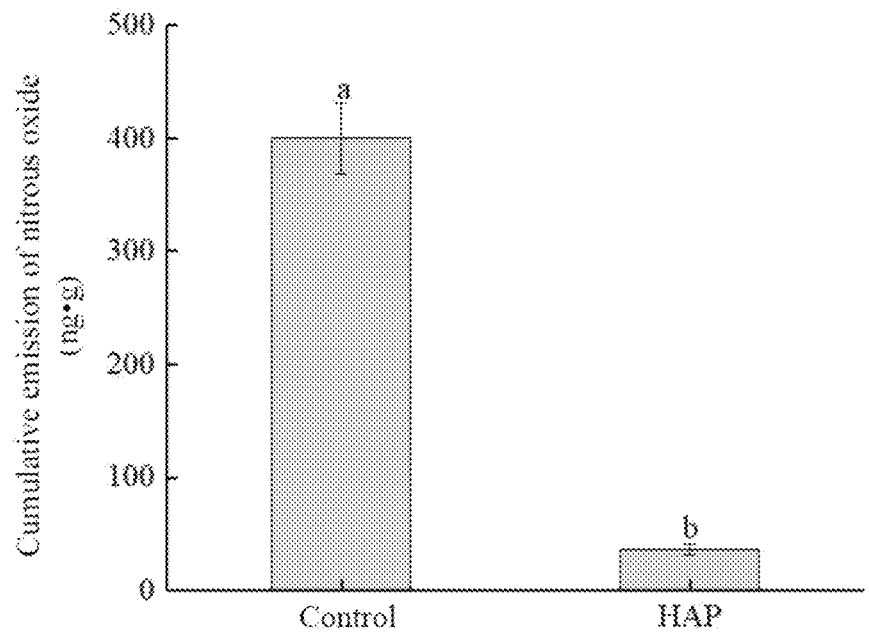
FIG. 4 is a graph of the effect of different emission reduction treatments on the cumulative emissions of nitrous oxide in the soils.

Cumulative emissions of nitrous oxide on different days and a cumulative emission of nitrous oxide on the $59^{th}$ day in the blank test soil and the blank test soil added with HAP were tested, as shown in FIGS. 3 and 4, respectively. It can be seen from the figures that the cumulative emission of nitrous oxide in the blank test soil without HAP is much larger than that in the blank test soil added with HAP, and the cumulative emission of nitrous oxide becomes more and more obvious with the increase of days.

Figure 5:
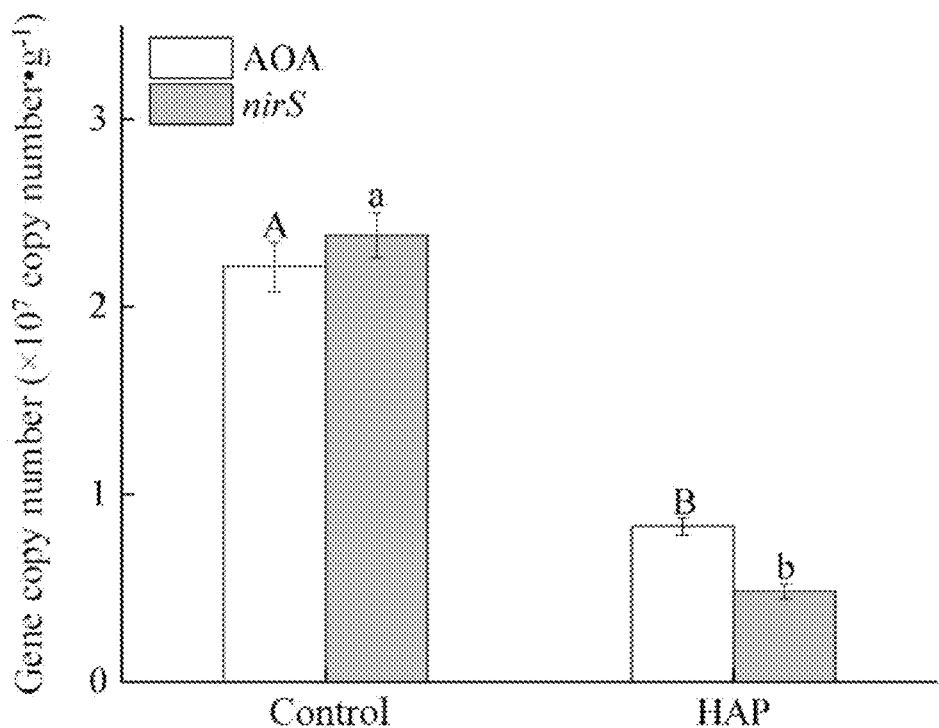
FIG. 5 is a graph showing functional gene copy numbers of nitrous oxide-producing microorganisms in the soils under different emission reduction treatments.

Functional gene copy numbers of nitrous oxide-producing microorganisms in the soil on the $38^{th}$ day in the blank test soil and the blank test soil containing HAP were tested, as shown in FIG. 5. It can be seen from FIG. 5 that AOA and nirS in the soil added with HAP are significantly lower than those in the blank test soil, inhibiting the emission of nitrous oxide and reducing the loss of N element in the soil, thus having a fertilizer-preserving effect. Therefore, this may be the main reason why HAP inhibits the emission of nitrous oxide.

Figure 6:
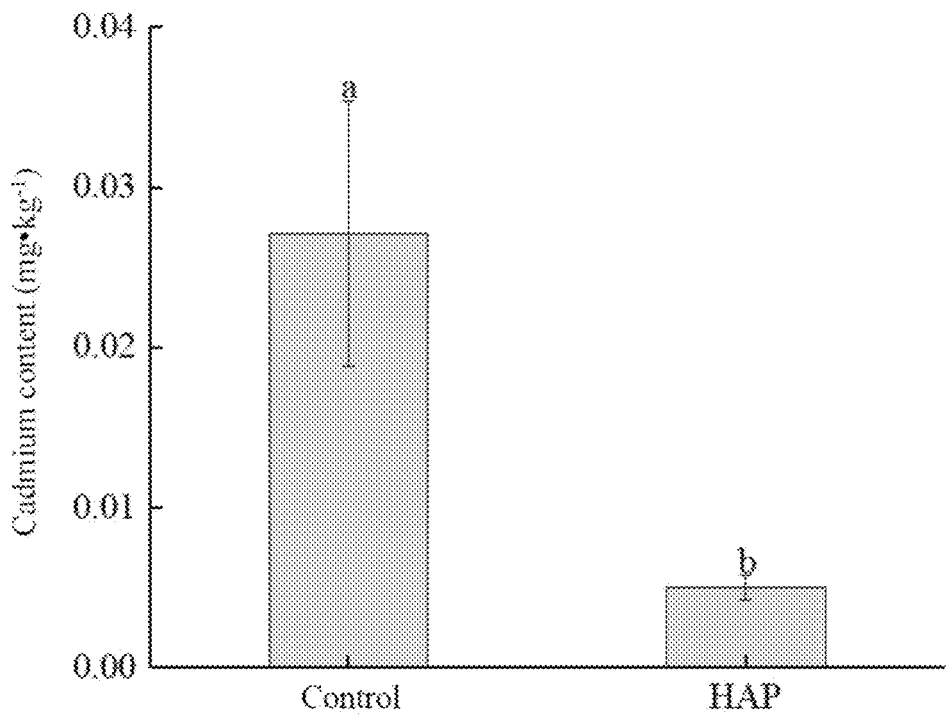
FIG. 6 is a graph showing the effect of HAP on the availability of cadmium in a blank test soil.
Figure 7:
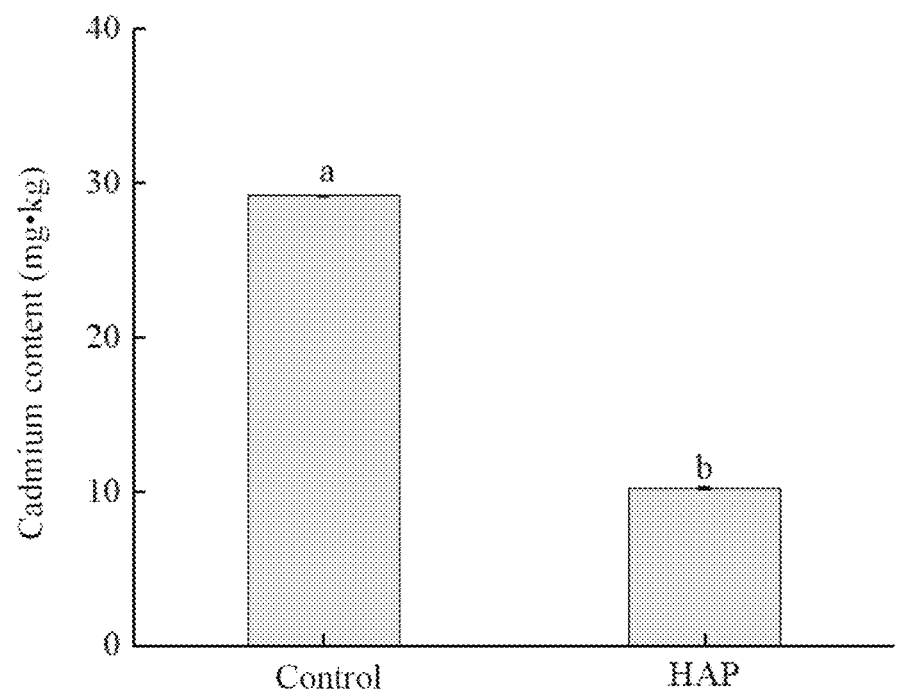
FIG. 7 is a graph showing the effect of HAP on the availability of a cadmium-contaminated soil.

Effects of HAP on available cadmium in a blank test soil and a heavy metal contaminated soil were tested. Specific test values are shown in FIGS. 6 and 7. It can be seen from FIGS. 6 and 7 that the cadmium contents in the blank test soil and heavy metal contaminated soil added with HAP are lower than that in the blank test soil without HAP. The possible reason is that HAP has adsorption and ion exchange properties to adsorb and replace cadmium ions, thus reducing the cadmium content in the soil.

Therefore, by adding HAP to soils in the present disclosure, the emission of nitrous oxide in the soil is effectively reduced, and the treatment of heavy metal contamination is realized at the same time, which is very suitable for the promotion and use of the nitrous oxide emission reduction in the contaminated soil. On the premise of no conflict, those skilled in the art can freely combine and superimpose the above additional technical features.

What has been described above is only the preferred implementation of the present disclosure, and all technical solutions that realize the objects of the present disclosure by basically the same means are within the protection scope of the present disclosure.

The invention claimed is:

1. A greenhouse gas emission reduction method for a soil, hydroxyapatite (HAP) being used to reduce the emission of a nitrogen-containing gas in the soil, the soil being a cadmium-contaminated soil containing ammonia-oxidizing archaea (AOA) and a nitrifying bacteria nirS, the greenhouse gas emission reduction method comprising:
air-drying the soil to obtain a dry soil; and
thoroughly mixing HAP with the dry soil, wherein
the nitrogen-containing gas is nitrous oxide, and an amount of HAP is 1-5% of a mass of the dry soil.

2. The greenhouse gas emission reduction method for a soil according to claim 1, further comprising:
preparing HAP by a sol-gel method using calcium nitrate and phosphoric acid as raw materials.

3. The greenhouse gas emission reduction method for a soil according to claim 2, wherein the sol-gel method for preparing HAP comprises:
mixing a calcium nitrate solution with a phosphoric acid solution;
adding aqueous ammonia at 40-50° C. to adjust a pH to 9-11;
reacting for 30-50 min;
ageing to obtain a colloid;
washing the colloid with water;
performing suction filtering to obtain a filter cake;
drying the filter cake;
calcining the dried filter cake; and
grinding and sieving the calcined filter cake to obtain HAP.

* * * * *